United States Patent
Blackketter et al.

(10) Patent No.: US 7,305,693 B2
(45) Date of Patent: Dec. 4, 2007

(54) USER INTERFACE FOR INTERACTIVE TELEVISION SYSTEMS

(75) Inventors: Dean J. Blackketter, San Francisco, CA (US); Timothy F. Park, Menlo Park, CA (US); Christopher White, San Francisco, CA (US); Jeffrey D Yaksick, Sunnyvale, CA (US)

(73) Assignee: Microsoft Corporation, Redmond, WA (US)

( * ) Notice: Subject to any disclaimer, the term of this patent is extended or adjusted under 35 U.S.C. 154(b) by 309 days.

(21) Appl. No.: 11/083,722

(22) Filed: Mar. 18, 2005

(65) Prior Publication Data

US 2005/0166256 A1    Jul. 28, 2005

Related U.S. Application Data

(63) Continuation of application No. 09/560,666, filed on Apr. 27, 2000.

(51) Int. Cl.
*H04N 7/16*    (2006.01)
*H04N 9/00*    (2006.01)
*H04N 5/445*   (2006.01)
*G06F 3/00*    (2006.01)
*G06F 13/00*   (2006.01)

(52) U.S. Cl. ............... 725/61; 725/9; 725/41
(58) Field of Classification Search .............. 725/9–21, 725/41, 61
See application file for complete search history.

(56) References Cited

U.S. PATENT DOCUMENTS

| | | | |
|---|---|---|---|
| 5,034,902 A | | 7/1991 | Steinmann |
| 5,850,249 A | | 12/1998 | Massetti et al. |
| 5,933,192 A | * | 8/1999 | Crosby et al. ......... 375/240.25 |
| 6,177,931 B1 | * | 1/2001 | Alexander et al. ............ 725/52 |
| 6,240,555 B1 | | 5/2001 | Shoff et al. |
| 6,421,728 B1 | | 7/2002 | Mohammed et al. |
| 6,567,982 B1 | | 5/2003 | Howe et al. |
| 6,600,496 B1 | * | 7/2003 | Wagner et al. .............. 715/716 |

* cited by examiner

*Primary Examiner*—Hunter B. Lonsberry
(74) *Attorney, Agent, or Firm*—Lee and Hayes, PLLC

(57) ABSTRACT

An interactive television system displays a television program having an associated channel. The system also displays an interactive television mode indicator if the displayed television program supports an interactive television mode. The interactive television mode is activated in response to a request from a viewer of the television program to activate the interactive television mode. The system updates a channel status list to indicate that the television program is being viewed in the interactive television mode. The system is also able to handle requests for activating an online television mode. When changing channels, the channel status list is used to restore a previously activated interactive television mode or online television mode for a particular television channel. Two different indicators may be displayed to indicate whether the television program supports an interactive television mode and/or an online television mode.

15 Claims, 9 Drawing Sheets

| Ch | Interactive Mode | Time Entered Interactive | Online Mode | Time Entered Online | Interactive Address | Online URL |
|---|---|---|---|---|---|---|
| 002 | Interactive | 12:24 | | | http://www.ad.. | |
| 005 | | | Online | 12:55 | | http://www.mi.. |
| 006 | | | | | | |
| 017 | Interactive | 12:31 | | | http://www.dis.. | |
| 028 | Interactive | 13:05 | | | http://www.ca.. | |
| 122 | | | Online | 13:17 | | http://www.tra.. |
| • | • | • | • | • | • | • |
| • | • | • | • | • | • | • |
| • | • | • | • | • | • | • |

342  344  346  348  350  352  354

| Ch ↗ 342 | Interactive Mode ↗ 344 | Time Entered Interactive ↗ 346 | Online Mode ↗ 348 | Time Entered Online ↗ 350 | Interactive Address ↗ 352 | Online URL ↗ 354 |
|---|---|---|---|---|---|---|
| 002 | Interactive | 12:24 | | | http://www.ad.. | |
| 005 | | | Online | 12:55 | | http://www.mi.. |
| 006 | | | | | | |
| 017 | Interactive | 12:31 | | | http://www.dis.. | |
| 028 | Interactive | 13:05 | | | http://www.ca.. | |
| 122 | | | Online | 13:17 | | http://www.tra.. |
| ... | ... | ... | ... | ... | ... | ... |

Fig. 11

USER INTERFACE FOR INTERACTIVE TELEVISION SYSTEMS

RELATED APPLICATIONS

This application is a Continuation of co-pending application Ser. No. 09/560,666, filed Apr. 27, 2000, entitled "User Interface for Interactive Television Systems", and incorporated herein by reference.

TECHNICAL FIELD

This invention relates to an interactive television system that allows a viewer to interact with the broadcaster or developer of a television program.

BACKGROUND

Until recently, television viewers received and viewed television broadcasts without any opportunity to interact with the broadcaster of the television program or the organization associated with the television program content. Newly developed systems, typically referred to as "interactive television systems", provide bi-directional communications between a viewer of a television program and, for example, the broadcaster or developer of the television program. Thus, interactive television systems allow a viewer to interact with the broadcaster or developer of the television program.

In an interactive television system, the television viewer interacts with the broadcaster by participating in polls, playing along with game shows, or requesting information from advertisers. Additionally, interactive television users can access news headlines, retrieve sports statistics, or chat with other sports fans or other viewers that share common interests. This interaction enhances the viewer's television viewing experience and allows the viewer to feel that they are actively participating in the television program rather than merely viewing the program.

A typical interactive television system uses a set-top box, or similar device, that receives television broadcasts and includes a modem that connects to a telephone line to allow transmission of data from the set-top box to the television broadcast source.

One type of interactive television system generates an indicator on the television screen which informs the viewer that an interactive mode is available for the program being displayed on the current channel. Using this system, the interactive mode cannot be activated unless the indicator is displayed on the television screen. If the viewer does not activate the interactive mode (for example, by pressing the appropriate button on a remote control device) within a particular time period, such as fifteen seconds, then the indicator is removed from the television screen. If the viewer later decides that they want to activate the interactive mode, the viewer is required to change to another channel and change back to the original channel to re-display the interactive mode indicator. Once the indicator is displayed, the interactive mode can be activated by the viewer.

This type of interactive television system also requires a viewer to re-activate an interactive mode each time the viewer changes channels. For example, if the viewer has activated the interactive mode for a particular television channel, changes channels, and returns to the original channel (which was previously in interactive mode), the viewer is required to re-activate the interactive mode for that channel. Thus, the system does not maintain an interactive mode status for the television channels. This repeated activation of the interactive mode is tedious for viewers that change channels frequently.

Disclosed herein is an interactive television system that addresses the shortcomings discussed above by allowing the user to activate an interactive mode regardless of whether a particular indicator is displayed on the television screen. Additionally, the interactive television system maintains the interactive mode associated with each channel.

SUMMARY

The interactive television system described herein maintains an interactive television mode or an online television mode on a channel-by-channel basis. Thus, the viewer is not required to re-activate the interactive mode or the online mode for a particular channel that was previously activated. Additionally, the interactive television system displays various indicators to notify the viewer that an interactive mode and/or an online mode is supported by the television program.

An embodiment of the interactive television device displays a television program having an associated channel. The device displays an interactive television mode indicator if the displayed television program supports an interactive television mode. The interactive television mode is activated in response to a request from a viewer of the television program to activate the interactive television mode. The device updates a channel status list to indicate that the television program is being viewed in the interactive television mode.

Another embodiment of the interactive television device displays a television program having an associated first channel. The device changes to a second channel and displays a television program associated with the second channel. An interactive television mode status of the second channel is determined from a channel status list. If the second channel is in an interactive television mode, then the device restores (or starts) interactivity.

In one embodiment of the interactive television device, a television program is displayed. The device displays a first indicator if the television program supports an interactive television mode. A second indicator is displayed if the television program supports an online television mode. The interactive television mode is activated if a viewer selects the first indicator and the online television mode is activated if the viewer selects the second indicator.

Particular embodiments of the interactive television device use multiple tuning devices to maintain the interactive television status or online television status for each channel.

BRIEF DESCRIPTION OF THE DRAWINGS

FIG. 11 illustrates a channel table that indicates the interactive mode and online mode status of one or more television channels.

DETAILED DESCRIPTION

The interactive television system described herein allows the user to activate an interactive television mode regardless of whether a particular indicator is displayed on the television screen. An interactive television mode allows the television viewer to interact with, for example, the broadcaster or developer of the television program. The interactive television system maintains the interactive mode associated with each channel on a channel-by-channel basis. The interactive television system also provides two separate indicators, one indicating that an interactive television mode is available, and another indicating that an online television mode is available. An online television mode allows the viewer to access one or more web pages associated with the television program.

Various examples and embodiments are described herein with reference to television programs. However, the systems and procedures described herein can be used with any type of video segment or video program, and are not limited to television programs.

Figure 1:
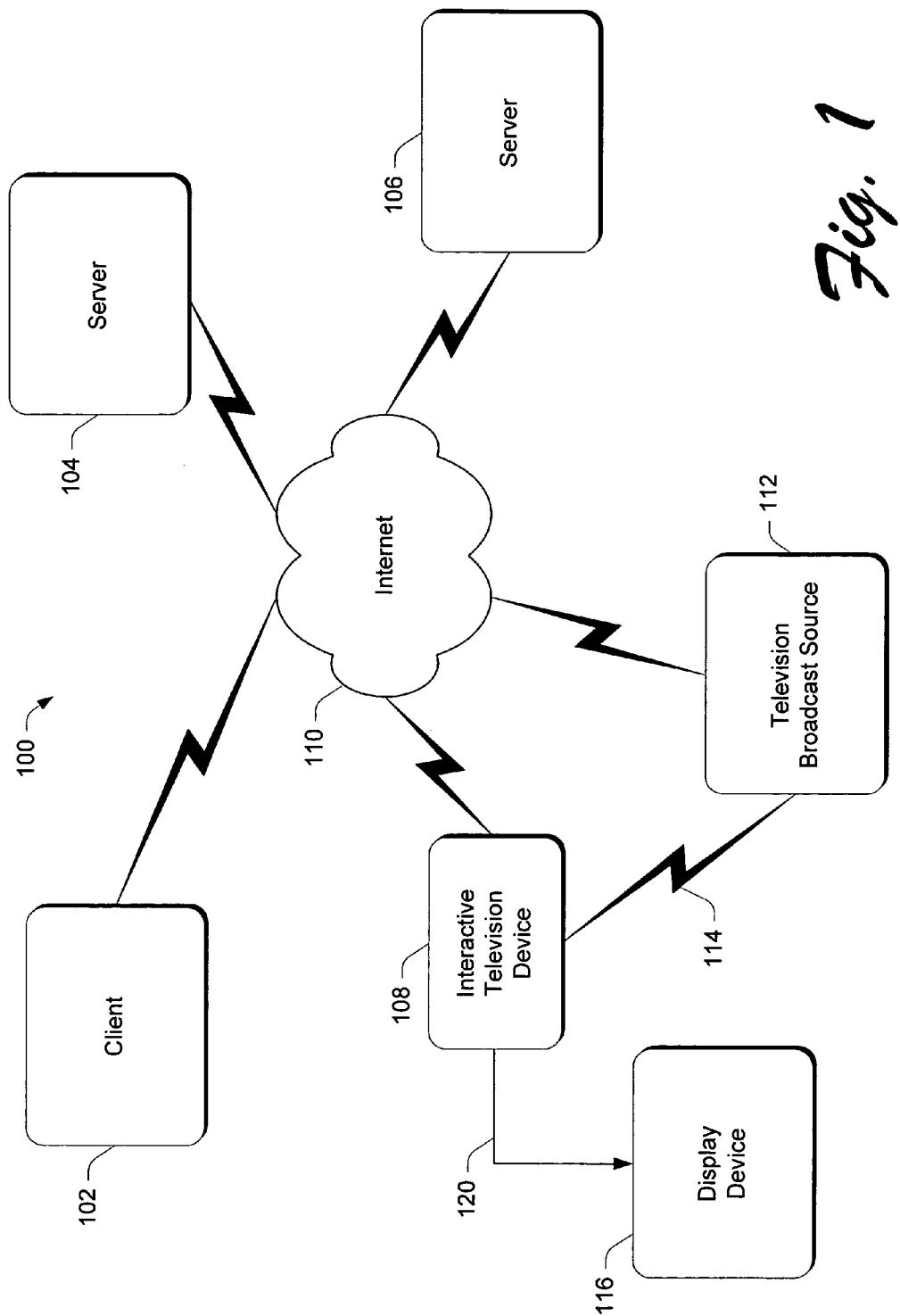
FIG. 1 illustrates an exemplary network environment in which an interactive television device transmits and receives data across the Internet and receives television signals from a television broadcast source.

FIG. 1 illustrates an exemplary network environment 100 in which an interactive television device 108 transmits and receives data across the Internet 110 and receives television signals from a television broadcast source 112. A client 102, servers 104 and 106, and the interactive television device 108 are coupled to one another through the Internet 110. Interactive television device 108 is capable of receiving various types of data from one or more devices coupled to the Internet 110. Interactive television device 108 is also coupled to the television broadcast source 112, which broadcasts television signals via a communication link 114. Interactive television device 108 may receive television signals from source 112 via cable, satellite, microwave, computer network, terrestrial (over the air) broadcast, or any other communication medium. Although not shown in FIG. 1, television broadcast source 112 may have an associated server or other device coupled to the Internet 110, which allows the source 112 to broadcast television signals via one medium (e.g., cable) and transmit other data related to the television broadcast via the Internet 110. Alternatively, television broadcast source 112 may transmit television signals as well as other data related to the television signals via the Internet 110.

Interactive television device 108 is also coupled to a display device 116 via a video communication link 120. Video communication link 120 may be a radio frequency (RF), s-video, composite video, component video, or other video link. Display device 116 may be any type of video display such as a television, a monitor, a flat panel display or a video projection system. The interactive television device 108 can be, for example, a set-top box, a game console, or a personal computer. Alternatively, interactive television device 108 may be integrated into another device such as a display device, a cable television receiver box or a satellite receiver box.

When operating in an interactive mode, interactive television device 108 typically receives television signals from source 112 via link 114. Interactive television device 108 communicates information to source 112 via the Internet 110. Thus, multiple communication links are utilized to establish an interactive session between the user of interactive television device 108 (i.e., the viewer of display device 116) and the television broadcast source 112. The television signal received on link 114 typically includes a video program, such as a television program. The television signal may also include one or more identifiers that indicate whether the current television program broadcast supports an interactive mode and/or an online mode.

Figure 2:
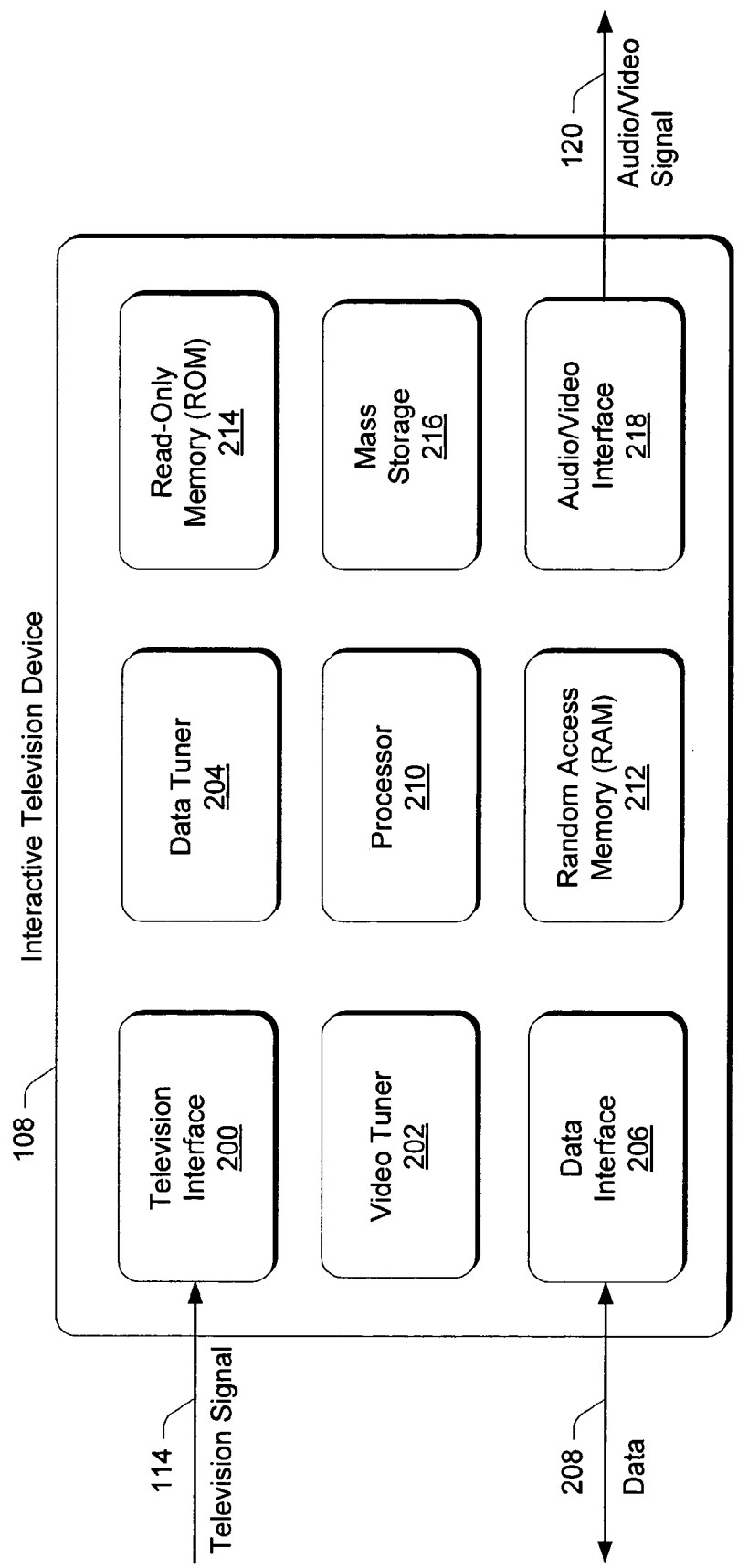
FIG. 2 is a block diagram of an interactive television device capable of receiving television signals and network data and generating video signals for display on a display device.

FIG. 2 is a block diagram of interactive television device 108, which is capable of receiving television signals and network data and generating video signals for display on a display device. A television interface 200 receives a broadcast television signal from broadcast source 112 on communication link 114. A video tuner 202 tunes the television signal received by interface 200. A data interface 206 provides a bi-directional data interface between a data communication link 208 and interactive television device 108. Data communication link 208 may use any type of communication medium and any communication protocol. In a particular embodiment of the invention, data communication link 208 is a telephone line that provides a data connection to the Internet or another data communication network, and data interface 206 includes a modem or other bi-directional data communication device. A data tuner 204 tunes (i.e., retrieves) data received across communication link 208. Alternatively, data tuner 204 may tune (or decode) data contained in a television signal received on a communication link, such as link 114.

Interactive television device 108 includes one or more processors 210, a random access memory (RAM) 212, a read-only memory (ROM) 214, and a mass storage device 216. Processor 210 is capable of implementing the various procedures and operations discussed herein. RAM 212 and mass storage device 216 provide for the storage of data, instructions, and other information used by processor 210 during the normal operation of interactive television device 108. ROM 214 stores various parameters and basic operating instructions used, for example, by processor 210. An audio/video interface 218 communicates audio and video signals across communication link 120 to a display device (such as display device 116). Although not shown in FIG. 2, interactive television device 108 may also include a remote control interface that allows a television viewer to control the functions of the interactive television device using a handheld remote control device.

Generally, the processor 210 of interactive television device 108 is programmed by means of instructions stored at different times in various computer-readable storage media of device 108, such as RAM 212, ROM 214, and mass storage 216. The interactive television system described herein includes various types of computer-readable storage media when such media contains instructions or programs for implementing the steps described herein in conjunction with a processor. The interactive television system also includes the device 108 itself when programmed according to the methods and techniques described herein. Alternatively, the interactive television system can be implemented in hardware or a combination of hardware, software, and/or firmware. For example, one or more application specific integrated circuits (ASICs) could be programmed to carry out the methods and techniques described herein.

Figure 3:
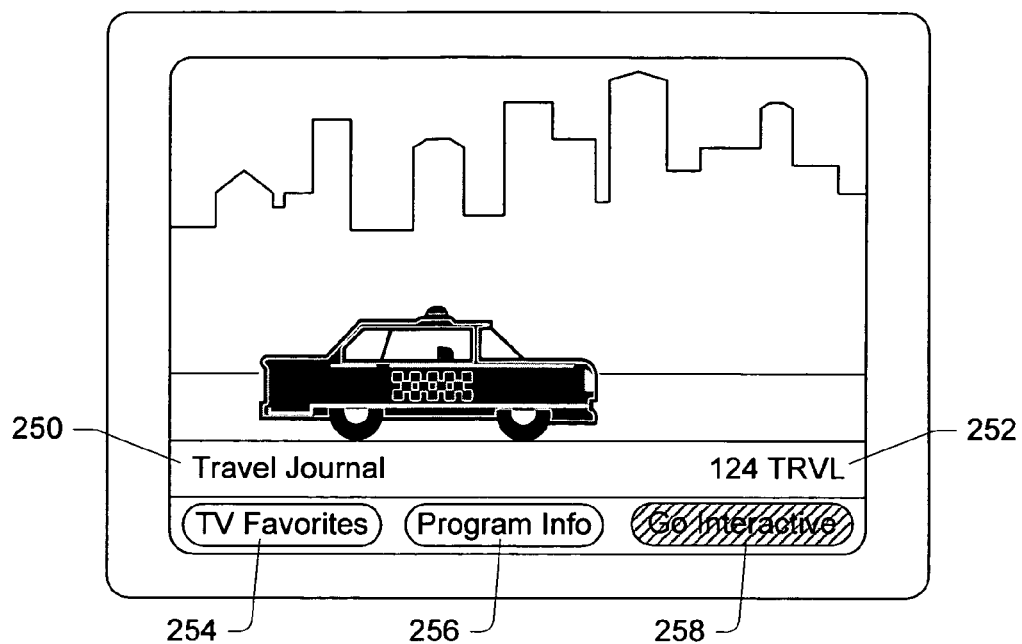
FIGS. 3-6 illustrate various television screen images with different interactive television controls and status displays.

FIGS. 3-6 illustrate various television screen images with different interactive television controls and status displays. Specifically, FIG. 3 illustrates a television screen image for a television program that does not have an associated interactive mode or online mode. The television display communicates information to the viewer about the current program. A program title 250 is displayed along with the channel ("124") and an abbreviated channel name 252 (i.e., "TRVL" for a travel-related channel). Three buttons are displayed along the bottom of the television screen shown in FIG. 3. A "TV Favorites" button 254 allows the viewer to display a list of favorite television stations, a "Program Info" button 256 allows the viewer to display information about the current program, and a "Go Interactive" button 258 (which is grayed-out, indicating that the feature is not available) would allow a viewer to activate an interactive mode.

Figure 4:
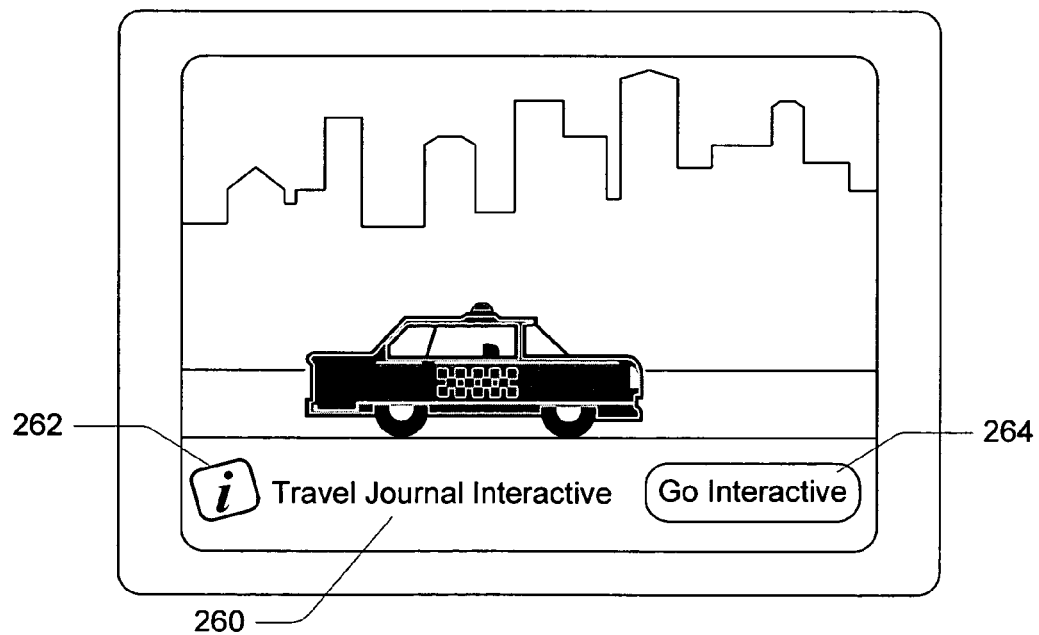

FIG. 4 illustrates another television screen image for a television program that has an associated interactive mode. The availability of an interactive mode is indicated by an icon 262 and a "Go Interactive" button 264 that allows the viewer to activate an interactive mode. The interactive mode associated with the screen of FIG. 4 is identified by a title 260, "Travel Journal Interactive." The viewer activates the interactive mode using a selection mechanism, for example, by pressing an appropriate interactive mode button on a remote control device or a set-top box. Alternatively, the interactive mode is activated by highlighting the "Go Interactive" button 264 (for example, using arrow keys on a remote control device or a set-top box) and activating the highlighted button 264. If the viewer does not activate the online mode within a particular period of time (such as fifteen seconds), the title 260, icon 262, and button 264 are removed from the television screen. After button 264 is removed from the television screen, the viewer can still activate an interactive mode by pressing, for example, an appropriate button on a remote control or a set-top box. Thus, the user is able to activate an interactive mode even though the indicators that an interactive mode is available are no longer displayed on the television screen.

Figure 5:
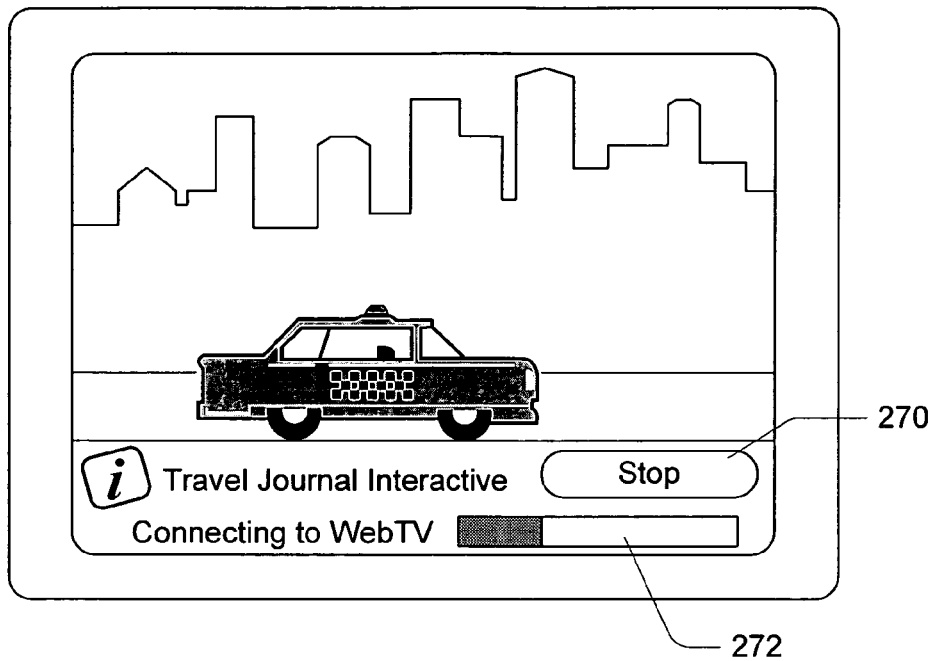

FIG. 5 illustrates a television screen image that appears after activating the interactive mode through the screen shown in FIG. 4. A "Go Interactive" button 264 (FIG. 4) is replaced with a "Stop" button 270, which allows the viewer to stop the activation of the interactive mode. A bar display 272 indicates that the interactive mode is being activated and shows the progress of the activation procedure. When the interactive mode is fully activated, bar display 272 is removed from the television screen. If the interactive mode can be established quickly, then the bar display 272 is not typically displayed. In this example, the interactive television device is a WebTV® Internet terminal manufactured by WebTV Networks, Inc., a subsidiary of Microsoft Corporation.

Figure 6:
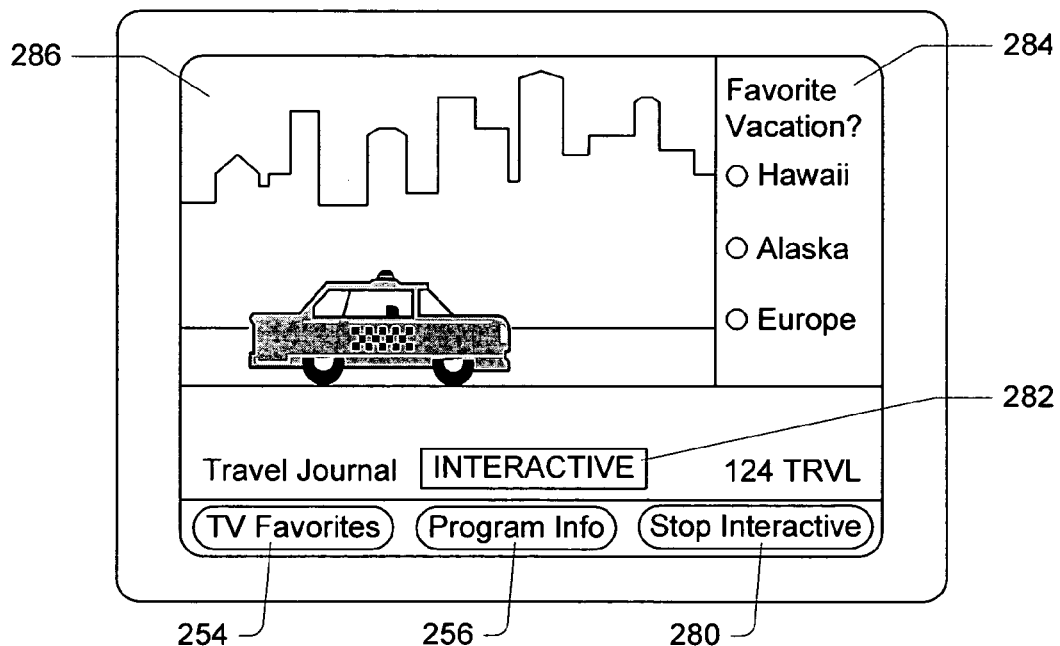

FIG. 6 illustrates a television screen image that appears after the interactive mode has been activated. The screen shown in FIG. 6 includes "TV Favorites" and "Program Info" buttons 254 and 256 similar to those illustrated in FIG. 3. A "Stop Interactive" button 280 allows the viewer to exit the interactive mode and return to a non-interactive television viewing mode. An indicator 282 informs the viewer that an interactive viewing mode is active. In the example of FIG. 6, an interactive window 284 is opened to the right of a program window 286. Interactive window 284 identifies a portion of the television screen that is used for interactive purposes. Interactive window 284 allows the viewer to interact with, for example, the television broadcast source. Examples of this interaction include answering a question or a poll, requesting information about a program or advertiser, or purchasing a product or service. In FIG. 6, the viewer is asked to select their favorite vacation destination. Program window 286 displays the current television program, which is reduced in size to allow space for the interactive window 284. By displaying both windows 284 and 286 simultaneously, the viewer is able to watch both the television program and the interactive questions or information displayed in window 284. Although a particular arrangement and sizing of windows is illustrated in FIG. 6, alternate embodiments may arrange and adjust the size of the displayed windows in any manner.

Figure 7:
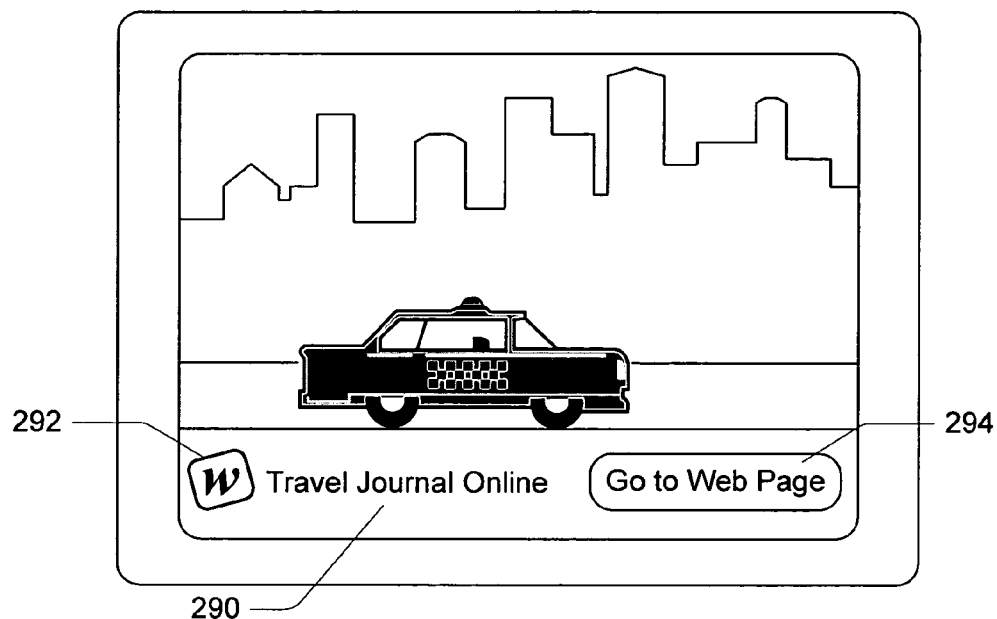
FIG. 7 illustrates a television screen image showing an online mode indicator and an option to switch to an associated web page.

FIG. 7 illustrates a television screen image showing an online mode indicator and an option to switch to an associated web page. The availability of an online mode is indicated by an icon 292 and a "Go to Web Page" button 294 that allows the viewer to activate an online mode. The "w" used in icon 292 represents that a web page (online mode) is available. The online mode associated with the screen of FIG. 7 is identified by a title 290, "Travel Journal Online." The viewer activates the online mode, for example, by pressing an appropriate button on a remote control or a set-top box. Activation of the online mode connects the viewer's interactive television device to a particular web page associated with the television program or an advertiser. A bar display (similar to bar display 272 in FIG. 5) is displayed while the interactive television device establishes a connection with the appropriate web page. Once a connection is established with the web page, the screen image may be divided into two or more display windows (for example, one window displaying the current program and the other window displaying the associated web page). Alternatively, the interactive television device may stop displaying the current program while in the online mode. This allows the entire television screen to be used for displaying the web page. In this example, the current program is re-displayed when the viewer finishes viewing the web page and activates a "Stop" or "Stop Online" function.

If the viewer does not activate the online mode within a particular period of time, the title 290, icon 292, and button 294 are removed from the television screen. After button 294 is removed from the television screen, the viewer can still activate the online mode by pressing an appropriate button on a remote control or a set-top box. Thus, the user is able to activate an online mode even though the indicators that an online mode is available are no longer displayed on the television screen.

Figure 8:
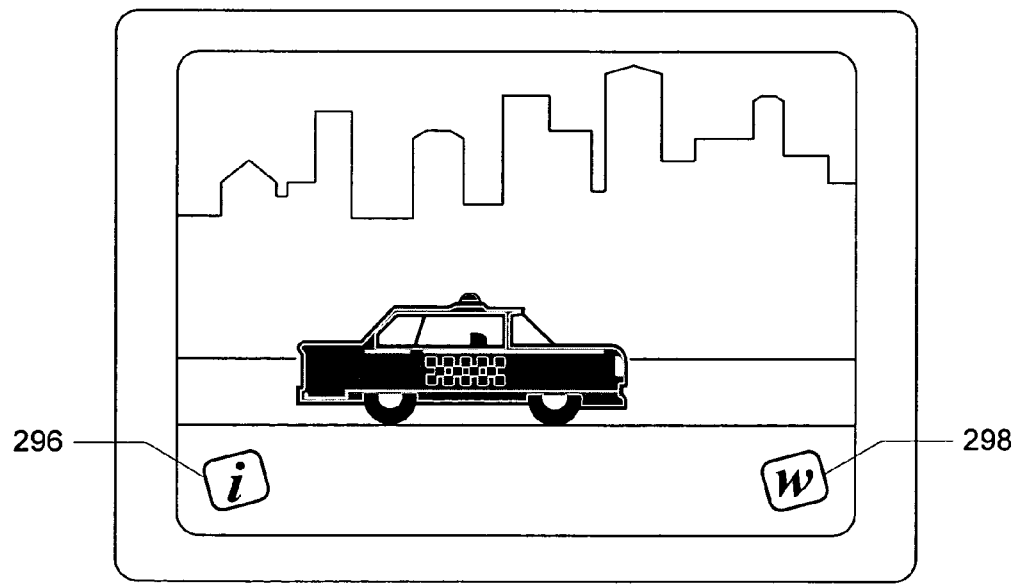
FIG. 8 illustrates a television screen image showing both an interactive mode indicator and an online mode indicator.

FIG. 8 illustrates a television screen image showing both an interactive mode indicator 296 and an online mode indicator 298. These small indicators 296 and 298 are less distracting to the viewer than displaying larger indicators, such as button 294 and title 290, shown in FIG. 7. The two indicators 296 and 298 notify the viewer that the current television program has both an interactive mode and an online mode. Typically, the viewer does not activate both the interactive mode and the online mode simultaneously. The viewer is able to activate either the interactive mode or the online mode by pressing an appropriate button on a remote control device or on a set-top box. For example, the remote control device or the set-top box may have buttons with a design that matches the design of indicator 296 and indicator 298. Activating one of these buttons activates the corresponding mode. Alternatively, the user may ignore both icons 296 and 298, and continue viewing the television program in a non-interactive, non-online mode. The two indicators 296 and 298 are removed from the television screen after a particular time period, such as fifteen seconds. Although the indicators 296 and 298 are removed from the television screen, the viewer remains able to activate either the interactive mode or the online mode by selecting appropriate button on the remote control device or the set-top box.

Figure 9:
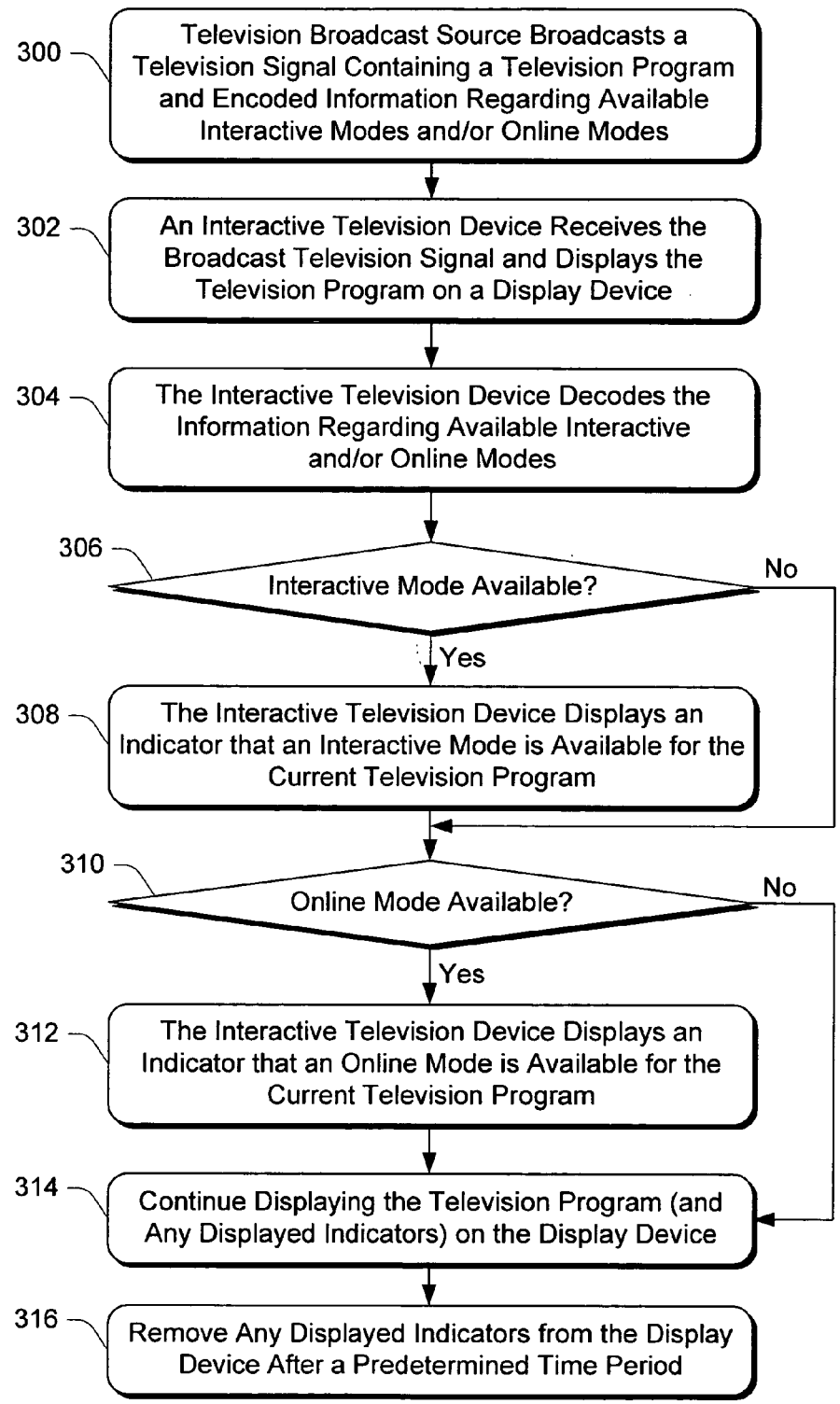
FIG. 9 is a flow diagram illustrating a procedure for displaying indicators that an interactive mode and/or an online mode is available.

FIG. 9 is a flow diagram illustrating a procedure for displaying indicators that an interactive mode and/or an online mode is available. A television broadcast source (such as source 112 in FIG. 1) broadcasts a television signal containing a television program and encoded information regarding available interactive modes and/or online modes (step 300). An interactive television device (such as device 108 in FIG. 1) receives the broadcast television signal and displays the television program on a display device (step 302). The interactive television device decodes the information regarding available interactive and/or online modes (step 304). Additionally, the interactive television device decodes information regarding a web site or network address for accessing the interactive data. The procedure then determines whether an interactive mode is available (step 306). If an interactive mode is not available, then the procedure branches to a step that determines whether an online mode is available. If an interactive mode is available, the interactive television device displays an indicator that an interactive mode is available for the current television program (step 308). This indicator may be any one or more of the title 260, the icon 262, or the "Go Interactive" button 264 shown in FIG. 4.

The procedure next determines whether an online mode is available (step 310). If an online mode is not available, then the procedure branches to step 314 without displaying an online mode indicator. If an online mode is available, the interactive television device displays an indicator that an online mode is available for the current television program (step 312). This indicator may be, for example, any one or more of the title 290, the icon 292, or the "Go to Web Page" button 294 shown in FIG. 7. The procedure continues displaying the television program (and any displayed indicators) on the display device (step 314). After a predetermined time period, such as fifteen seconds, any displayed indicators are removed from the display device (step 316). Removing any indicators after a particular time period avoids creating a distraction to a viewer that is not interested in activating an interactive mode or an online mode.

Figure 10:
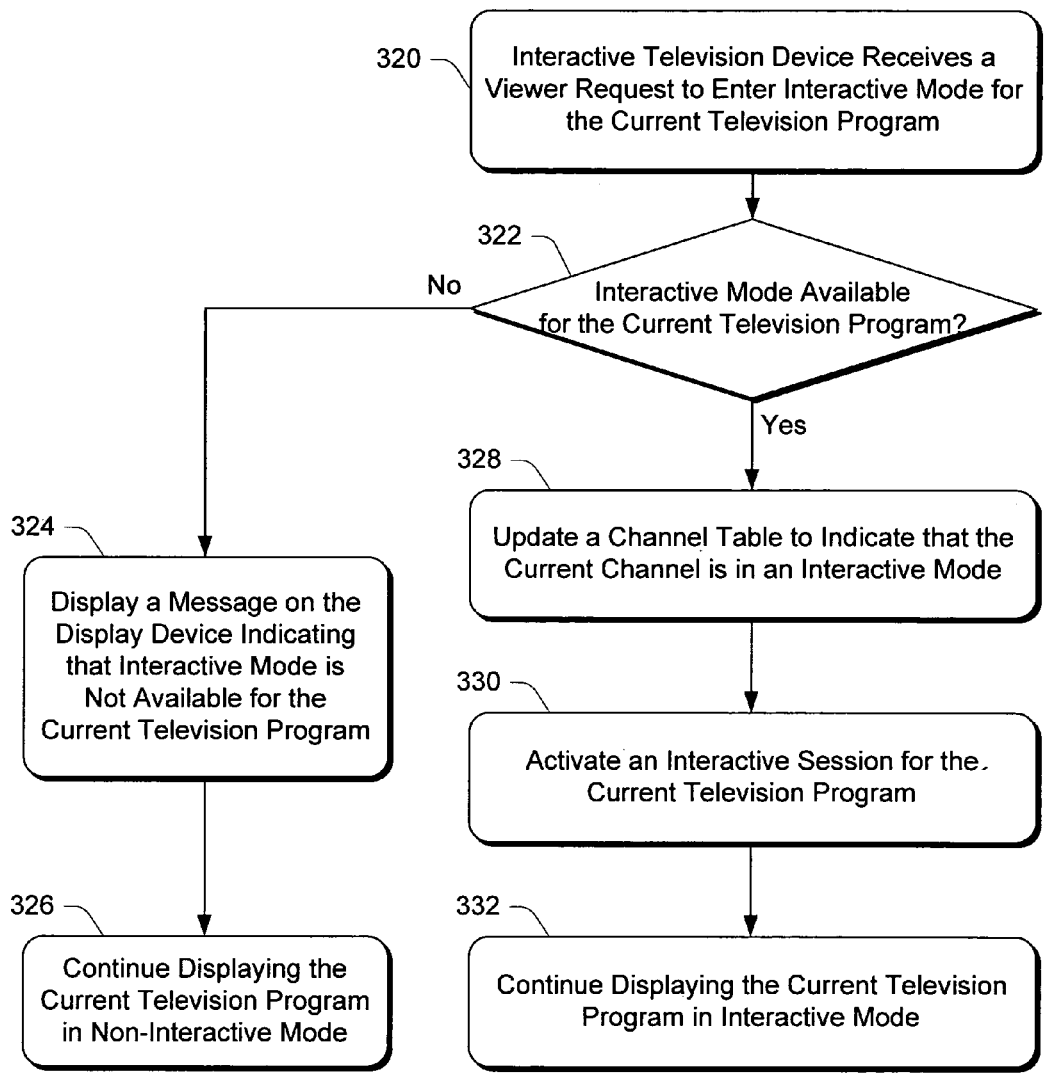
FIG. 10 is a flow diagram illustrating a procedure for handling a request to enter an interactive mode for the current television program.

FIG. 10 is a flow diagram illustrating a procedure for handling a request to enter an interactive mode for the current television program. An interactive television device receives a viewer request to enter interactive mode for the current television program (step 320). Next, the interactive television device determines (e.g., from the decoded information contained in the television signal) whether an interactive mode is available for the current television program (step 322). If an interactive mode is not available for the current television program, then the interactive television device displays a message on the display device indicating that an interactive mode is not available for the current television program (step 324). The interactive television device continues displaying the current television program in non-interactive mode (step 326). In an alternate embodiment, the interactive television device ignores the viewer request to enter an interactive mode.

If an interactive mode is available for the current television program, then the interactive television device updates a channel table stored in the interactive television device to indicate that the current channel is in an interactive mode (step 328). The interactive television device activates an interactive session for the current television program (step 330). The network address or other information identifying the source of the interactive data is decoded by the interactive television device from the television signal received from the television broadcast source. The interactive television device continues displaying the current television program in interactive mode (step 332). A procedure similar to that described with respect to FIG. 10 is used for handling a request to enter an online mode for the current television program.

FIG. 11 illustrates a channel table that maintains various information regarding different television channels, such as the interactive mode and online mode status of one or more television channels. In a particular embodiment, the channel table is stored in the interactive television device (e.g., using RAM 212 or mass storage 216). Alternatively, the channel table may be stored in any device that is accessible by the interactive television device. The channel table can be stored locally (e.g., on a device coupled directly to the interactive television device) or remotely (e.g., on a server or other device accessible via the Internet). Although FIG. 10 shows a single channel table containing information relating to both interactive modes and online modes, an alternate embodiment uses two separate tables, one for interactive mode and another for online mode.

The channel table contains a first column 342 that indicates a particular television channel. A column 344 indicates whether a television viewer has activated an interactive mode for an associated channel. In the example of FIG. 11, the viewer has activated an interactive mode for channels 2, 17, and 28. A column 346 indicates the time that the interactive mode was entered. For example, in FIG. 11, the interactive mode for channel 2 was activated at 12:24 and the interactive mode for channel 28 was activated at 13:05 (1:05 p.m.). The time that the interactive mode was entered is used by the interactive television device to determine when to automatically deactivate the interactive mode for a particular channel. For example, the interactive mode for a particular channel may be deactivated after one hour or at the beginning of the next hour (e.g., 13:00, 14:00, etc.).

A column 348 indicates whether a television viewer has activated an online mode for an associated channel. In the example of FIG. 11, the viewer has activated an online mode for channels 5 and 122. A column 350 indicates the time that the online mode was entered for each channel in the online mode. A column 352 indicates an interactive address associated with each channel in the interactive mode. A uniform resource locator (URL) or other address can be used to identify the source or location of the interactive content. A column 354 indicates an online uniform resource locator (URL) associated with each channel in the online mode. The online television device uses the URL to retrieve the appropriate web page when the viewer activates the online mode. For example, channel 5 may have an associated online URL of "http://www.microsoft.com/events". The entries in the channel table shown in FIG. 11 are changed as the viewer activates or deactivates the interactive mode or the online mode associated with one or more channels.

Figure 12:
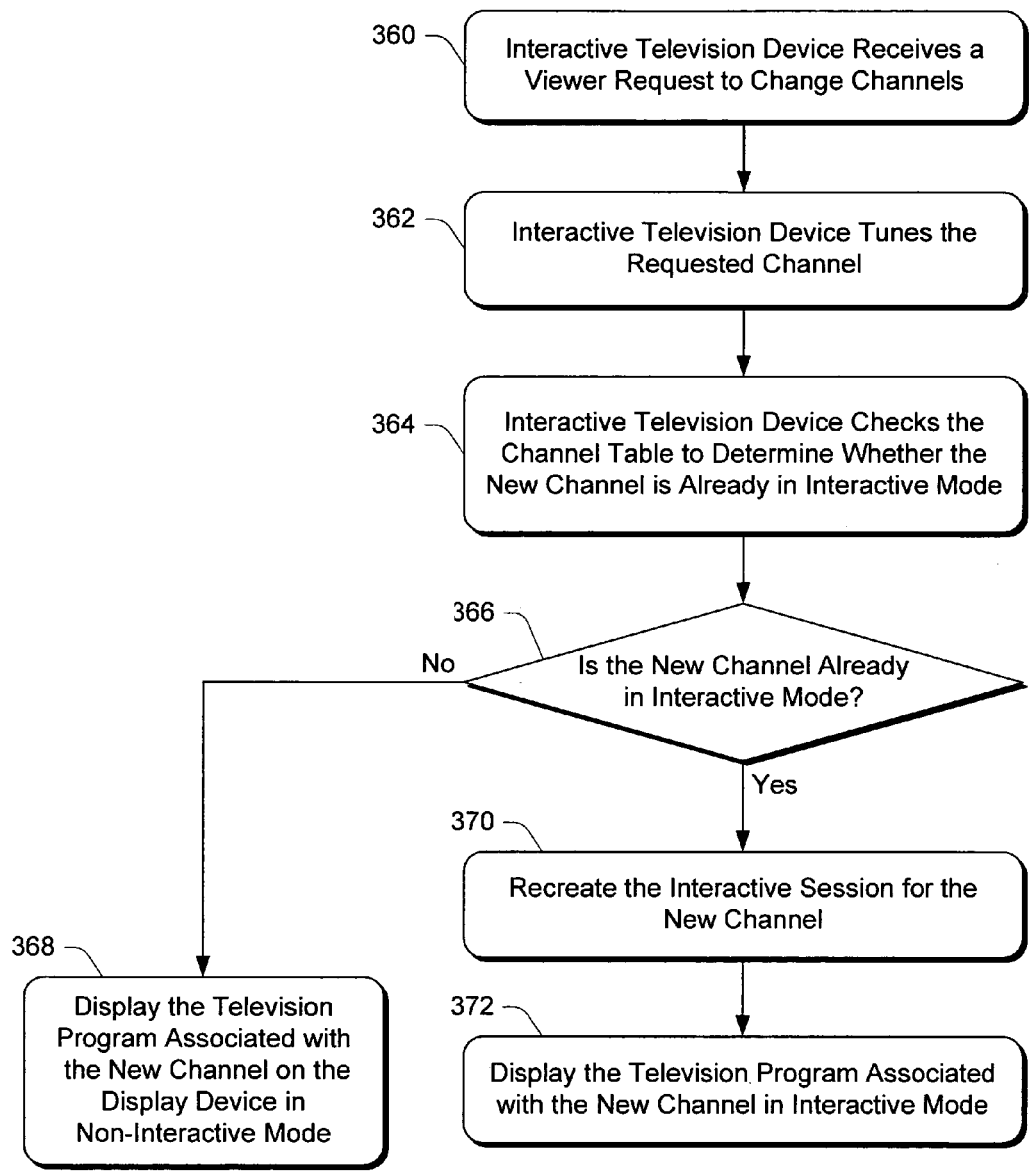
FIG. 12 is a flow diagram illustrating a procedure for establishing the proper interactive mode when changing television channels.

FIG. 12 is a flow diagram illustrating a procedure for establishing the proper interactive mode when changing television channels. An interactive television device receives a viewer request to change channels (step 360). The interactive television device tunes the requested channel (step 362) and checks the channel table to determine whether the new channel is already in interactive mode (step 364). For example, using the channel table shown in FIG. 11, the interactive television device checks the entry in column 344 corresponding to the new channel. If the new channel is not already in the interactive mode, the interactive television device displays the television program associated with the new channel on the display device in non-interactive mode (step 368). If the viewer later activates an interactive mode for the new channel, then the channel table will be updated to indicate that the new channel is in an interactive mode.

If the new channel is already in the interactive mode, the interactive television device recreates the interactive session for the new channel (step 370). Recreating the interactive session includes redisplaying the last page the viewer was viewing before they changed channels. Recreating the interactive session includes displaying an interactive window, such as interactive window 284 shown in FIG. 6. As discussed above with respect to FIG. 2, the interactive television device includes multiple tuners such that the interactive state of multiple channels can be maintained simultaneously. Typically, a data tuner is less expensive than a video tuner. An interactive television device can operate with a single video tuner because a single video image is tuned at a given moment. The interactive television device does not typically need to create two different images from two different channels simultaneously. Furthermore, to maintain a connection with a broadcast source (such as an interactive source) or an online web page, data tuning is necessary, but video tuning is not required. Thus, a particular interactive television device includes a single video tuner and multiple data tuners. Each additional data tuner allows the interactive television device to maintain the interactive state of another channel simultaneously. For example, if an interactive television device contains one video tuner and ten data tuners, the device is able to maintain the interactive state of eleven television channels simultaneously.

After reactivating the interactive session for the new channel, the interactive television device then displays the television program associated with the new channel in interactive mode (step 372). A procedure similar to that illustrated in FIG. 12 is followed for establishing the proper online mode when changing television channels.

The various information encoded in the broadcast signal regarding the availability of an interactive mode and/or an online mode as well as other program information may be contained in a template. For example, a template may include a title field, a description field, an interactive mode field, an online mode field, and any other fields necessary to describe the program or the various modes of viewing the program. The template may also contain information indicating a network address or URL necessary to allow the interactive television device to communicate with the broadcast source or retrieve the appropriate web pages. Additionally, the template may contain information about the type or types of indicators that should be displayed to indicate the availability of an interactive or online mode for a particular television program.

In one embodiment, information about the availability of interactive and/or online modes as well as one or more mode indicators is broadcast as part of the television signal using the Advanced Television Enhancement Forum (ATVEF) specification version 1.1 (draft version) or any subsequent versions of the specification.

Thus, a system has been described that maintains the interactive mode or status on a channel-by-channel basis such that he viewer is not required to re-activate the interactive mode for a channel that was previously activated. Additionally, the described system provides a system that displays various indicators to notify the viewer that an interactive mode and/or an online mode is available.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. An apparatus comprising means for displaying a television program, wherein the means for displaying a television program displays an interactive television mode indicator if the displayed television program supports an interactive television mode, the means for displaying a television program activates the interactive television mode in response to a request from a viewer of the television program to activate the interactive television mode, wherein the means for displaying a television program includes means for updating a channel status list to indicate that the television program is being viewed in the interactive television mode, wherein the means for displaying a television program includes a plurality of means for tuning to maintain the interactive television status for each channel, wherein the plurality of means for tuning include video tuning means for tuning a current television program and a plurality of data tuning means for tuning a television programs previously activated in the interactive television mode; and wherein there are a greater number of data tuning means than video tuning means.

2. An apparatus as recited in claim 1 wherein the means for updating a channel status list records a time that the interactive television mode was activated.

3. An apparatus as recited in claim 1 wherein the channel status list identifies all channels for which the interactive television mode has been activated.

4. An apparatus as recited in claim 1 wherein the plurality of means for tuning include means for tuning a current television program and means for tuning a television program previously activated in the interactive television mode.

5. A method comprising:
displaying a video program;
displaying an interactive video mode indicator if the displayed video program supports an interactive video mode, wherein a video tuning devices and multiple data tuning devices maintain the interactive video status for each video channel, and wherein there are a greater number of data tuning devices than video tuning devices;
activating the interactive video mode in response to a request from a viewer of the video program to activate the interactive video mode; and
updating a channel status list to indicate that the video program is being viewed in the interactive video mode.

6. A method as recited in claim 5 wherein the channel status list identifies all video channels for which the interactive video mode has been activated.

7. A method as recited in claim 5 wherein the channel status list maintains a list of television channels for which an online mode has been activated.

8. A method as recited in claim 5 further comprising:
receiving a request to display a different channel;
determining whether the different channel was previously viewed in interactive video mode; and
displaying the requested channel in interactive video mode if the channel was previously viewed in interactive video mode.

9. A method comprising:

displaying a video program;

displaying an interactive video mode indicator if the displayed video program supports an interactive video mode, wherein a video tuning devices and multiple data tuning devices maintain the interactive video status for each video channel, and wherein there are a greater number of data tuning devices than video tuning devices;

receiving a viewer request to activate the interactive video mode;

activating the interactive video mode in response to the viewer request; and updating a status list to indicate that the video program is being viewed in the interactive video mode, wherein the status list is updated to include a time that the interactive mode was activated.

10. A method as recited in claim 9 wherein the video tuner tunes a current video program and at least one data tuner tunes a data program previously activated in the interactive video mode.

11. A method as recited in claim 9 wherein the separate tuning devices include a first tuner to tune a first video program and a second tuner to tune a second video program simultaneously.

12. A method as recited in claim 9 wherein the separate tuning devices include a first tuning device to tune the current video program, a second tuning device to tune a first video program previously activated in the interactive video mode, and a third tuning device to tune a second video program previously activated in the interactive video mode.

13. A method as recited in claim 9 wherein the video program is a television program.

14. A method as recited in claim 9 wherein the status list identifies all channels for which the interactive video mode has been activated.

15. A method as recited in claim 9 wherein the status list maintains a list of all video programs for which an online mode has been activated.

* * * * *